United States Patent [19]

Breant

[11] Patent Number: 5,159,006
[45] Date of Patent: Oct. 27, 1992

[54] FLAME-RETARDED POLYMER COMPOSITIONS AND THEIR APPLICATION TO ELECTRIC CABLE SHEATHS

[75] Inventor: Patrice Breant, route de Lille, France

[73] Assignee: Norsolor, Mazingarbe, France

[21] Appl. No.: 639,743

[22] Filed: Jan. 11, 1991

Related U.S. Application Data

[63] Continuation of Ser. No. 451,284, filed as PCT/FR88/00645, Dec. 28, 1988, abandoned.

[30] Foreign Application Priority Data

Dec. 30, 1987 [FR] France .................. 87 18394

[51] Int. Cl.$^5$ .................. C08K 3/10; C08K 3/22
[52] U.S. Cl. .................. 524/436; 524/437
[58] Field of Search ............ 524/405, 413, 436, 437

[56] References Cited

U.S. PATENT DOCUMENTS

| | | | |
|---|---|---|---|
| 4,353,817 | 10/1982 | Nakae et al. | 524/232 |
| 4,673,620 | 6/1987 | Shulman et al. | 428/379 |
| 4,722,959 | 2/1988 | Inoue | 524/436 |
| 4,845,146 | 7/1989 | Inoue | 524/436 |
| 5,002,996 | 3/1991 | Okuda et al. | 524/413 |

FOREIGN PATENT DOCUMENTS

| | | |
|---|---|---|
| 82407 | 6/1983 | European Pat. Off. . |
| 0212142 | 3/1987 | European Pat. Off. . |
| 3605848 | 8/1987 | Fed. Rep. of Germany . |
| 2498609 | 7/1982 | France . |
| 2569411 | 2/1986 | France . |
| 2569412 | 2/1986 | France . |
| 2011745 | 1/1987 | Japan | 524/436 |
| 3286449 | 11/1988 | Japan | 524/436 |
| 2190384 | 11/1987 | United Kingdom . |

OTHER PUBLICATIONS

Trade Specification of Norsoflex LW 2220, 6 pages, Oct. 1986.
Trade Specification of Lotader 3200, 3 pages, Oct. 1986.
Trade Specification of Escorene VL 00728 2 pages.

*Primary Examiner*—Paul R. Michl
*Assistant Examiner*—Peter Szekely
*Attorney, Agent, or Firm*—Finnegan, Henderson, Farabow, Garrett & Dunner

[57] ABSTRACT

Flame-retarded polymer compositions comprising a hydrated inorganic filler, at least one ethylene-vinyl acetate copolymer and at least one copolymer of ethylene and at least one α-olefin, characterized in that they consist essentially of 120 to 240 parts by weight of hydrated inorganic filler per 100 parts by weight of a polymeric phase constituted:

a) of 15 to 55 parts by weight of at least one ethylene-vinyl acetate copolymer (A) having a vinyl acetate content of between 20 and 50% by weight, b) of 25 to 62 parts by weight of at least one ethylene-alkyl (meth)acrylate-unsaturated dicarboxylic acid anhydride terpolymer (b), c) of 8 to 45 parts by weight of at least one copolymer of ethylene and at least one α-olefin (C) having a density of between 0.990 and 0.915 and a crystallinity level at least equal to 5%, and d) of 0 to 5 parts by weight of at least one low density polyethylene (D).

11 Claims, No Drawings

FLAME-RETARDED POLYMER COMPOSITIONS AND THEIR APPLICATION TO ELECTRIC CABLE SHEATHS

This application is a continuation of Ser. No. 07/415,284, filed as PCT/FR88/00645, Dec. 28, 1988, now abandoned.

The present invention relates to flame-retarded polymer compositions containing copolymers of ethylene. More particularly, these compositions do not contain halogenated derivatives and are suitable to be converted by conventional techniques into articles which resist fire well, such as, in particular, insulating sheaths for metal cables.

The improvement of the fire resistance of compositions containing polymeric materials is a constant objective of manufacturers and converters of these materials, aiming to obtain a notable reduction in the flammability and the flame propagation ability of these materials. The use of halogenated derivatives as flame-retardant agents is well known, but has the great disadvantage of leading, at the time of combustion, to toxic and corrosive gases. The manufacturers and converters have therefore directed themselves towards the development of compositions containing oxides, hydroxides or inorganic metal salts such as the hydrates of alumina and magnesia.

However, the addition of such inorganic fillers in sufficient quantities to obtain good fire resistance leads to materials which have mediocre mechanical properties and/or great difficulties in conversion by the conventional methods such as extrusion. Thus, the addition of large quantities of hydrate of alumina to an ethylene-vinyl acetate copolymer leads to a composition the mechanical properties of which are very much inferior to those of the said copolymer. These mechanical properties can then be improved by a complementary addition, for example of a copolymer of ethylene and at least one α-olefin, but the fire resistance is degraded, which forces an increase in the content of hydrate of alumina, which results in a further diminution of the mechanical properties.

The problem which the present invention aims to resolve is to define flame-retarded polymer compositions by means of compounds such as the hydrates of alumina or magnesia, which simultaneously have a good fire resistance, acceptable mechanical properties and ease of use, that is to say not excessively diminished compared with those of the compositions which do not contain a fire-retardant agent. The different constituents must have good compatibility so that the compositions can be used without difficulty.

This problem can be resolved by means of the compositions according to the invention.

A first subject of the present invention consists in flame-retarded polymer compositions comprising a hydrated inorganic filler, at least one ethylene-vinyl acetate copolymer and at least one copolymer of ethylene and at least one α-olefin, characterized in that they consist essentially of 120 to 240 parts by weight of hydrated inorganic filler per 100 parts by weight of a polymeric phase constituted:

a) of 15 to 55 parts by weight of at least one ethylene-vinyl acetate copolymer (A) having a vinyl acetate content of between 20 and 50% by weight, b) of 25 to 62 parts by weight of at least one ethylene-alkyl (meth)acrylate-unsaturated dicarboxylic acid anhydride terpolymer (B), c) of 8 to 45 parts by weight of at least one copolymer of ethylene and at least one α-olefin (C) having a density of between 0.880 and 0.915 and a crystallinity level at least equal to 5%, and d) of 0 to 5 parts by weight of at least one low density polyethylene (D). 7 Hydroxides of aluminium Al(OH)$_3$ and magnesium Mg(OH)$_2$, for example of a mean particle size which is advantageously between 0.5 and 2 μm can be mentioned as examples of hydrated inorganic fillers which are usable in the compositions according to the invention.

The ethylene-vinyl acetate copolymers (A) are generally obtained by copolymerisation under high pressure and at high temperature in the presence of free radical initiators.

By ethylene-alkyl (meth)acrylate-unsaturated dicarboxylic acid anhydride terpolymer (B) is preferably understood, according to the present invention, a compound comprising:

from 83 to 98.7 mole % of residues derived from ethylene, from 1 to 14 mole % of residues derived from at least one ester of acrylic and/or methacrylic acid, and from 0 3 to 3 mole % of residues derived from an unsaturated dicarboxylic acid anhydride such as, for example, maleic anhydride.

The fluidity index of the terpolymer (B), measured under the standard conditions (190° C., load of 2.16 kg) of the standard ASTM D-1238, is advantageously between 1 and 10 dg/min.

This terpolymer can be obtained, for example, in the conditions described in documents FR-A-2498609, FR-A-2569411 and FR-A-2569412. The ester of acrylic or methacrylic acid preferably contains an alkyl group of 1 to 8 carbon atoms. For example a methyl, ethyl, n-propyl, isopropyl, n-butyl, iso-butyl, n-pentyl, n-hexyl, 1-2-ethyl hexyle, n-octyle and cyclohexyl acrylates and methacrylates may be mentioned.

The copolymer (C) of ethylene and at least one α-olefin is obtained by copolymerisation in the presence of catalytic systems of the Ziegler type. It generally has a standard fluidity index (as described above) of between 1 and 5 dg/min.

The low density polyethylene (D) is obtained by homopolymerisation of ethylene at high temperature (generally 140° to 350° C.) and under high pressure (generally 1000 to 4000 bars) in the presence of a free radical initiator (such as oxygen, the peroxides or the peresters). Its density is generally between 0.915 and 0.935, and it has a standard fluidity index (as defined above) which is advantageously between 1 and 10 dg/min.

Among the compositions according to the invention, those which contain:

a) from 20 to 55 parts by weight of copolyer (A)
b) from 26 to 52 parts by weight of terpolymer (B)
c) from 13 to 42 parts by weight of copolymer (C)
d) from 0 to 3 parts by weight of polyethylene (D) per 100 parts by weight of polymeric phase are particularly advantageous.

Those which contain, per 100 parts by weight of polymeric phase:

a) from 30 to 40 parts by weight of copolymer (A)
b) from 35 to 45 parts by weight of terpolymer (B)
c) from 23 to 33 parts by weight of copolymer (C) are more particularly preferred.

The compositions according to the invention generally have an oxygen limit index (as defined below) of at least 35%, an elongation to breaking of at least 110%, and a break resistance of at least 11 MPa.

The compositions according to the invention can be prepared by malaxating the ingredients in the powder or granule form so as to obtain a homogeneous ready-to-use mixture.

They can also be prepared by malaxation and then melting and granulation of the constituents from the polymeric phase. The granules obtained are then malaxated with the required quantity of flame-retarding agent with the object of providing an homogeneous ready-to-use mixture.

Finally the compositions can be prepared by malaxation of all the constituents, those of the polymeric phase being in the melted state, then extrusion and granulation. Extrusion can also be carried out on a coextruder; the compositions in which the polymeric phase is in the melted state and the hydrated inorganic filler regularly dispersed, can therefore be directly converted, for example into a sheath for a metal cable.

A second subject of the present invention relates to industrial articles containing a composition such as described above. More particularly these industrial articles consist in an electric cable sheath.

In addition to this application to cabling, the compositions according to the invention have other applications in which their fire resistant character and their good mechanical properties are required. They have the advantage of being capable of being converted into industrial articles (sheets, plates, profiles, hollow bodies, tubes, hoses), which have improved fire resistance, by conventional techniques for the conversion of polyolefins (extrusion, injection, rotary moulding).

The following examples have the object of illustrating the invention in a non-limiting manner.

All the compositions are prepared by making a mixture of the different constituents in the powder or granule state in an internal mixer, in which the polymeric constituents are melted, then extruding the mixture by means of a twin-screw extruder at a temperature of 145° C. All of them contain 150 parts by weight of hydrate of alumina $Al(OH)_3$ of mean particle size 1 μm.

The following properties are measured on the extruded compositions:
- the break resistance (BR) determined according to standard ASTM D-638 and expressed in megapascals (MPa),
- the elongation to breaking (EB), determined according to standard ASTM D-638, and expressed in %,
- the oxygen limit index (OLI) determined according to the standard ASTM D-2863, and expressed in %.

EXAMPLES 1 to 4 (comparative)

The compositions were prepared using the following constituents:
- an ethylene-vinyl acetate copolymer (A) having a vinyl acetate content of 28% by weight, a fluidity index (measured according to standard ASTM D-1238 at 190° C. under a load of 2.16 kg) equal to 7 dg/min, sold under the name Escorene UL 00728,
- an ethylene - n - butyl acrylate - maleic anhydride terpolymer (B) containing 97.8 mole % of units derived from ethylene, 1.2 mole % of units derived from n-butyl acrylate and 1 mole % of units derived from maleic anhydride, sold by the Norsolor company under the name Lotader LX 4110,
- an ethylene-1-butene copolymer (C) having a density of 0.910, a fluidity index (measured according to standard ASTM D-1238 at 190° C. under a charge of 2.16 kg) of 2.7 dg/min., sold by the Norsolor company under the name Norsoflex LW 2220, The quantities in parts by weight of the constituents used to prepare the compositions, and the results of the measurements of their properties are indicated in Table I.

None of the control compositions simultaneously combines satisfactory properties. In particular, their elongation to breaking is insufficient for the applications envisaged.

TABLE I

| Example | (A) | (B) | (C) | BR | EB | OLI |
|---|---|---|---|---|---|---|
| 1 | 100 | — | — | 7 | 100 | 33 |
| 2 | — | 100 | — | 14 | 70 | 31 |
| 3 | — | — | 100 | 12 | 90 | 28 |
| 4 | 50 | — | 50 | 9 | 60 | 29 |

EXAMPLES 5 to 13

The same constituents were used as in comparative examples 1 to 4, in quantities in parts by weight which are shown in Table II.

The results of the measurements carried out are also shown in table II.

TABLE II

| Example | (A) | (B) | (C) | BR | EB | OLI |
|---|---|---|---|---|---|---|
| 5 | 33 | 33 | 34 | 12 | 124 | 36 |
| 6 | 15 | 62 | 23 | 14 | 110 | 37 |
| 7 | 30 | 62 | 8 | 13 | 110 | 37 |
| 8 | 55 | 37 | 8 | 11 | 115 | 37 |
| 9 | 55 | 25 | 20 | 11 | 120 | 36 |
| 10 | 30 | 25 | 45 | 12 | 116 | 35 |
| 11 | 15 | 40 | 45 | 14 | 115 | 37 |
| 12 | 34 | 39 | 27 | 13 | 125 | 37 |
| 13 | 40 | 50 | 10 | 13 | 116 | 37 |

We claim:

1. Flame-retarded polymer compositions comprising a hydrated inorganic filler, at least one ethylene-vinyl acetate copolymer and at least one copolymer of ethylene and at least one α-olefin, characterized in that they consist essentially of 120 to 240 parts by weight of hydrated inorganic filler per 100 parts by weight of a polymeric phase constituted:
   a) of 15 to 55 parts by weight of at least one ethylene-vinyl acetate copolymer (A) having a vinyl acetate content of between 20 and 50% by weight,
   b) of 25 to 62 parts by weight of at least one ethylene-alkyl (meth)acrylate-unsaturated dicarboxylic acid anhydride terpolymer (B),
   c) of 8 to 45 parts by weight of at least one copolymer of ethylene and at least one α-olefin (C) having a density of between 0.880 and 0.915 and a crystallinity level at least equal to 5%, and
   d) of 0 to 5 parts by weight of at least one low density polyethylene (D).

2. Compositions according to claim 1, characterized in that they contain, per 100 parts by weight of polymeric phase:
   a) from 20 to 55 parts by weight of copolymer (A)
   b) from 26 to 52 parts by weight of terpolymer (B)
   c) from 13 to 42 parts by weight of copolymer (C)
   d) from 0 to 3 parts by weight of polyethylene (D)

3. Compositions according to claim 1, characterized in they contain, per 100 parts by weight of polymeric phase:
   a) from 30 to 40 parts by weight of copolymer (A)
   b) from 35 to 45 parts by weight of terpolymer (B)
   c) from 23 to 33 parts by weight of copolymer (C)

4. Compositions according to claim 1, characterized in that the hydrated inorganic filler is hydrate of alumina used at a rate of 150 parts by weight per 100 parts of polymeric phase.

5. Compositions according to claim 1, characterized in that the copolymer (A) contains about 28% by weight of residues derived from vinyl acetate.

6. Compositions according to claim 1, characterized in that the terpolymer (B) comprises:
   from 83 to 98.7 mole % of residues derived from ethylene,
   from 1 to 14 mole % of residues derived from at least one ester of acrylic and/or methacrylic acid, and
   from 0.3 to 3 mole % of residues derived from an unsaturated dicarboxylic acid anhydride.

7. Compositions according to claim 1, characterized in that the terpolymer (B) has a standard fluidity index of between 1 and 10 dg/min.

8. Compositions according to claim 1, characterized in that the copolymer (C) has a standard fluidity index of between 1 and 5 dg/min.

9. Compositions according to claim 1, characterized in that they have an oxygen limit index at least equal to 35, an elongation to breaking at least equal to 110% and a break resistance at least equal to 11 MPa.

10. Industrial articles containing a composition according to claim 1.

11. Industrial articles according to claim 10, characterized in that they consist of an electric cable sheath.

* * * * *